July 29, 1958     P. A. SIECZKIEWICZ     2,844,844

METHOD PREPARING EDIBLE FOWL

Filed Feb. 14, 1956

INVENTOR.
PETER SIECZKIEWICZ
BY Elliott & Pastoriza
ATTORNEYS

United States Patent Office 2,844,844
Patented July 29, 1958

2,844,844

METHOD OF PREPARING EDIBLE FOWL

Peter A. Sieczkiewicz, Westerly, R. I., assignor of one-half to Salvatore R. Rizzo, La Puente, Calif.

Application February 14, 1956, Serial No. 565,347

7 Claims. (Cl. 17—45)

This invention generally relates to a method of preparing and processing edible fowl for human consumption, and more particularly to a method of removing the bones from an edible fowl in such a manner as to preserve substantially the entire outer skin of the fowl, whereby the fowl may be stuffed, pre-cooked and/or frozen preparatory to distribution in an attractive and convenient form to the ultimate user.

For illustrative purposes, the invention will be described with reference to an edible turkey, although it will be appreciated that the method may equally well be employed in conjunction with other types of edible fowl, for example, chickens, geese, and the like.

Turkeys are now processed in a variety of forms to comply with the needs and desires of different type consumers. In one conventional method, the meat of the turkey is stripped from the carcass and cut to a convenient size for packaging in various sized jars and can containers. In another case, the flesh of the turkey is maintained intact and the turkey is similarly packaged for sale in a pre-shaped can or the like. More recently, methods have been devised for completely removing the bones from the turkey and still retaining the skin and flesh structure. However, the latter methods have been dependent for their successful accomplishment upon forming a plurality of incisions through the skin of the turkey as a preliminary step, in order to facilitate and enable the successive removal of the different structures.

It will be apparent that a disadvantage characteristic of all the above methods presently used is the fact that either the skin of the turkey is completely removed or it is severed to the extent that the turkey as a whole does not retain its original appearance. In addition, it will be evident that after the boning operation has taken place, the turkey must be sewn along the incision lines or else firmly bound or tied together with the result that a further detraction from the natural appearance of the turkey will result.

It is, therefore, a primary object of the present invention to provide a method of removing the bones from an edible fowl, and yet retaining the skin structure completely intact except for the neck and rear openings without causing incisions to be made therein.

Another object of the present invention is to provide a method of removing the bones from an edible fowl without severing the skin thereof, except for the neck and rear openings whereby the skin and flesh structure of the fowl may be retained in a shape and form aesthetically attractive to the consumer and yet convenient for cooking, carving and serving purposes.

These and other objects and advantages of the present invention are realized by using the neck or rear opening of the turkey as a means of ingress and egress for a particular boning tool which may be required, and thereafter for removal of the separate bones therethrough. Another feature of the method is the progressive turning back or reversing of the skin and flesh of the turkey to provide a more unrestricted working area for the further cutting away and removal of other bones. Generally, when the neck opening is utilized, the bones are successively removed starting with the wing bones and thereafter working down through the turkey's body to the leg bones.

A better understanding of the method of the present invention will be had by reference to the accompanying drawings which are shown for illustrative purposes only, and in which.

Figure 1:
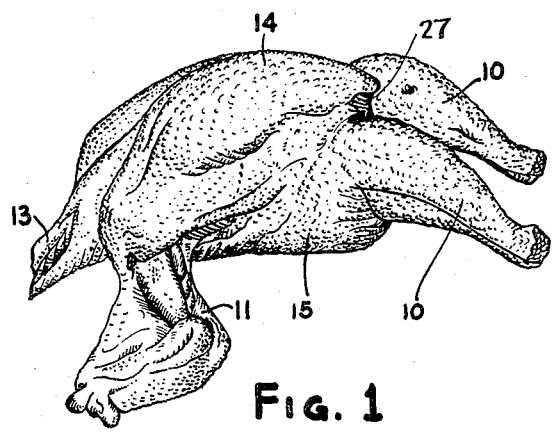
Figure 1 is a view of a dressed turkey.

In Figure 1 there is shown a dressed fowl or turkey, as it is received by the butcher, with its intestines, feet and head removed. The turkey is shown as having legs 10 and wings 11. The back portion of the turkey is denoted by the numeral 14 and the breast portion is indicated at 15, while the neck or crop opening is identified by the numeral 13.

Figure 2:
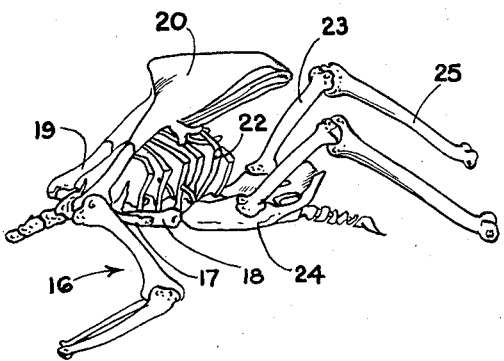
Figure 2 is a general view of the bone structure of the turkey of Figure 1.

In the performance of the method of the present invention, no special tools are required, and the removal of the bones may be accomplished with a conventional butcher's boning knife, in conjunction with the use of his fingers and fingernails. Towards this end, the first step is to insert the boning knife through the neck opening 13 and begin the successive disjointing and removal of the various bones. The bone removal procedure may be more clearly described by reference to Figure 2. Initially, the wing bones 16 are disjointed from and severed from the shoulder blade bones 17. The wing bones 16 are thereafter removed through the neck opening 13 as the wings 11 themselves are reversed such that the skin and flesh are turned back inside out. After the wing bones 16 have been removed and the wings 11 turned back, the shoulder blade bones 17 are cut away from their connection to the upper back bone 18 and similarly removed through the neck opening 13.

The next step is to remove the wish bone 19 connected to and forming the upper portion of the breast bone 20. The wish bone 19 is severed from the breast bone 20 and similarly taken out through the neck opening. At this point either the breast bone 20 or the upper backbone 18 may be disjointed for removal. Before the breast bone 20 or upper backbone 18 are removed, rib bones 22 are first broken and removed from the turkey. Thereafter, the breast bone 20 and upper backbone 18 are taken out through the neck opening 13.

As this operation is proceeding, it is desirable for the butcher to continually roll back the skin and flesh as the bones are removed in order that he may have access to the bones still remaining within the turkey body. Where certain larger bodied fowl are involved, it may not be necessary to turn back the skin except during the removal of the leg and wing bones. For the purpose of removing the bones, it is desirable that the butcher employ his fingers for breaking the bone joints, while at the same time utilizing the boning knife and his fingernails as a means of scraping back the flesh and skin, whereby the meat will not be drawn out with the bones.

Continuing with the bone removing steps, the thigh bones 23 are separated from the lower backbone 24 and from the leg bones 25, and the thigh bones 23 are then removed. Thereafter, the leg bones 25 may be simply removed. At this time the only bone structure remaining will be the upper backbone 21 and the lower backbone 24 which as a connected structure may be easily slipped out from within the body of the turkey.

Figure 3:
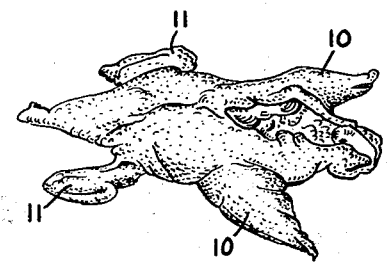
Figure 3 is a view of the turkey of Figure 1 after the bone structure, as shown in Figure 2, is removed therefrom; and, Figure 4 is a view of the turkey of Figure 3 after stuffing and final preparation for the consumer.
Figure 4:
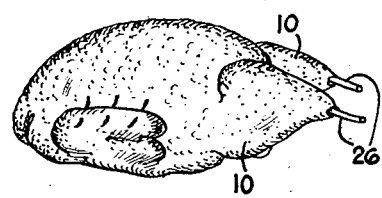

In view of the progressive normal turning back of the skin and flesh, it will be appreciated that after all the bones have been removed in accordance with the foregoing method steps, the turkey will be substantially turned inside out with the skin in the interior and the flesh exposed. At this time, the turkey may be turned back to its normal position by drawing back the flesh towards the neck opening 13 so that the skin is again in its natural position on the outer surface of the turkey. Without the supporting bone structure, the turkey will have the flat, flabby appearance as indicated in Figure 3, with the wings 11 and legs 10 stretched out. In order to prepare the turkey for distribution and sale, the turkey may be stuffed in a conventional manner, although it will be appreciated that since the fowl is limp and flabby that a great deal of care must be taken to assure that the skin and flesh will not be inadvertently ruptured or damaged. For this purpose the wings should either be secured with respect to each other, or with respect to the body of the turkey. Similarly, the legs should preferably be held together or to the body of the turkey as the stuffing operation is proceeding. Thereafter, the legs may be provided with skewers or similar strengthening members 26, as indicated in Figure 4, and the wings attached in a conventional manner to the breast portion of the turkey, whereby the turkey may then be precooked and frozen or merely frozen preparatory to eventual distribution and sale to the ultimate consumer.

By the proper and careful stuffing and proper disposition of the wings and legs, the turkey can be reshaped to its initial form, as shown in Figure 1, whereby it will have an attractive, natural appearance to the consumer and yet be readily susceptible of convenient and simple carving and serving.

From the foregoing description, it will be apparent that the method of the present invention enables a simple and expedient process of removing the bones from an edible fowl without in any way detracting from the natural appearance of the skin of the fowl.

Although a preferred embodiment of the method has been described, it will be appreciated that certain steps may be changed without departing from the spirit and scope of the invention. It is in fact, conceivable to use the rear opening, indicated at 27 in Figure 1 for removal of the bones by using a somewhat reverse method, although the use of the neck opening is deemed preferable.

What is claimed is:

1. The method of preparing an edible, dressed fowl provided with neck and rear openings, comprising the steps of: successively disjointing certain of the bones within said fowl; successively separating said bones from the flesh of said fowl; and, progressively removing said bones through one of said openings, whereby the outer skin is left intact.

2. The method according to claim 1, in which the flesh of said fowl is generally turned back on itself as said disjointing and separating steps are performed.

3. The method according to claim 1, in which the flesh of the wings and legs of said fowl is turned back on itself as the wing and leg bones are, respectively, removed through said one of said openings.

4. The method according to claim 2, in which said flesh is thereafter turned back to its original form.

5. The method of preparing an edible, dressed fowl provided with neck and rear openings, comprising the steps of: successively disjointing certain of the bones within said fowl; successively separating said bones from the flesh of said fowl; progressively removing said bones through said neck opening; and, turning back portions of the flesh of said fowl as said bones are removed.

6. The method according to claim 5, in which said flesh is thereafter turned back to its original form.

7. The method of preparing an edible fowl, according to claim 5, in which the successive disjointing of the bones within said fowl is achieved by the following successive steps: initially disjointing the wing bones from the shoulder blade bones; next disjointing the shoulder blade bones from the upper backbone; next disjointing the wish bone from the main portion of the breast bone; next breaking the rib bones from the breast bone; next disjointing the breast bone and the back bone and, finally, disjointing the thigh bones of the lower back bone and the leg bones.

References Cited in the file of this patent

UNITED STATES PATENTS

| | | |
|---|---|---|
| 2,267,442 | Clark | Dec. 23, 1941 |
| 2,571,544 | Cutrera | Oct. 16, 1951 |